(12) United States Patent
Minami

(10) Patent No.: US 7,448,356 B1
(45) Date of Patent: Nov. 11, 2008

(54) MULTIPOINT IGNITION DEVICE

(75) Inventor: Katsuaki Minami, Nagano (JP)

(73) Assignee: Miyama, Inc., Nagano (JP)

( * ) Notice: Subject to any disclaimer, the term of this patent is extended or adjusted under 35 U.S.C. 154(b) by 0 days.

(21) Appl. No.: 11/976,525

(22) Filed: Oct. 25, 2007

(30) Foreign Application Priority Data

Aug. 6, 2007 (JP) .............................. 2007-203846

(51) Int. Cl.
*F02P 15/08* (2006.01)
*F02P 15/02* (2006.01)

(52) U.S. Cl. ................... 123/310; 123/169 EL; 313/123

(58) Field of Classification Search ............. 123/145 A, 123/148 B, 169 EL, 169 MG, 310; 313/141, 313/123, 128
See application file for complete search history.

(56) References Cited

U.S. PATENT DOCUMENTS

| | | | | |
|---|---|---|---|---|
| 2,904,610 A * | 9/1959 | Morrison | ................ | 123/169 R |
| 4,470,392 A * | 9/1984 | Yoshinaga et al. | .......... | 123/310 |
| 4,535,735 A * | 8/1985 | Yoshinaga et al. | .......... | 123/310 |
| 5,046,466 A * | 9/1991 | Lipski | ........................ | 123/310 |
| 6,161,520 A * | 12/2000 | Clarke | ......................... | 123/310 |
| 6,807,933 B2 * | 10/2004 | Lipski | .................. | 123/169 EL |
| 7,299,785 B1 * | 11/2007 | Lee | ............................. | 123/310 |
| 2004/0084001 A1 * | 5/2004 | Lipski | .................. | 123/169 EL |

FOREIGN PATENT DOCUMENTS

| | | |
|---|---|---|
| JP | 01-193080 | 8/1989 |
| JP | 02-123281 | 5/1990 |
| JP | 04-183925 | 6/1992 |

\* cited by examiner

*Primary Examiner*—Stephen K Cronin
*Assistant Examiner*—Arnold Castro
(74) *Attorney, Agent, or Firm*—Rabin & Berdo, PC

(57) ABSTRACT

A plurality of electrode pairs (P1 to P8) are caused to project from a side wall of a combustion chamber (2) of an engine, and a distance between ignition gaps (G1 to G8) and the side wall of the combustion chamber (2) is varied according to the positions of the plurality of electrode pairs (P1 to P8).

8 Claims, 4 Drawing Sheets

MULTIPOINT IGNITION DEVICE

TECHNICAL FIELD OF THE INVENTION

This invention relates to a multipoint ignition device in which a plurality of ignition gaps are disposed in a single combustion chamber.

BACKGROUND OF THE INVENTION

JP2-123281A and JP1-193080A disclose a multipoint ignition device in which a plurality of electrode pairs constituting ignition gaps are disposed around a cylinder opening portion such that an air-fuel mixture in a combustion chamber is ignited from the plurality of ignition gaps.

According to this device, in comparison with a conventional spark plug that performs ignition only from the center of the combustion chamber, combustion of the air-fuel mixture in the peripheral edge portions of the combustion chamber is promoted, enabling improvements in engine output and fuel economy.

SUMMARY OF THE INVENTION

To ensure that a flame generated upon ignition propagates quickly through the entire combustion chamber so that an air-fuel mixture in the combustion chamber burns in a short time period, the flames that grow from the respective ignition gaps ideally have a uniform propagation speed.

However, the propagation speed of the flame that grows from each ignition gap receives a cooling effect (extinguishing action) from the wall surface of the combustion chamber. The extinguishing action varies according to the position on the wall surface of the combustion chamber such that when the extinguishing action is large, the amount of energy used to propagate the flame decreases, leading to a lower propagation speed, and when the extinguishing action is small, the propagation speed of the flame rises. Thus, unevenness occurs in the propagation speed of the flame.

This invention has been designed in consideration of this technical problem, and it is an object thereof to make the propagation speeds of flames that grow from respective ignition gaps in a multipoint ignition device uniform.

In a multipoint ignition device according to this invention, a plurality of electrode pairs are caused to project from a side wall of a combustion chamber of an engine, and the propagation speed of a flame that grows from each ignition gap is made uniform by varying the distance between the ignition gap and the side wall of the combustion chamber according to the respective positions of the plurality of electrode pairs.

According to this invention, a post-ignition flame can propagate through an entire combustion chamber quickly, enabling a reduction in the amount of time required to burn an air-fuel mixture in the combustion chamber.

DESCRIPTION OF THE PREFERRED EMBODIMENT

An embodiment of this invention will be described below with reference to the attached drawings.

Figure 1:
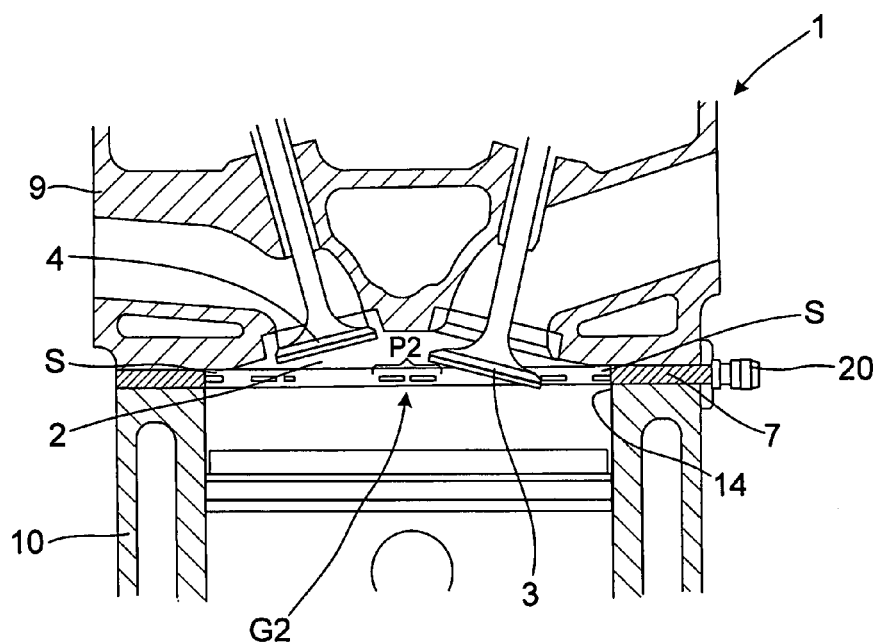
FIG. 1 is a schematic constitutional diagram of an engine comprising a multipoint ignition device according to this invention.

FIG. 1 shows the schematic constitution of an engine 1 comprising a multipoint ignition device 7 according to this invention. The engine 1 is a four-valve engine having two intake valves 3 and two exhaust valves 4 for a single combustion chamber 2. The combustion chamber 2 is a so-called pent roof (triangular roof) type in which a squish area S, where the height of the combustion chamber 2 is lower than the height of the other parts, is formed in intake side and exhaust side corner portions of the combustion chamber 2.

Figure 2:
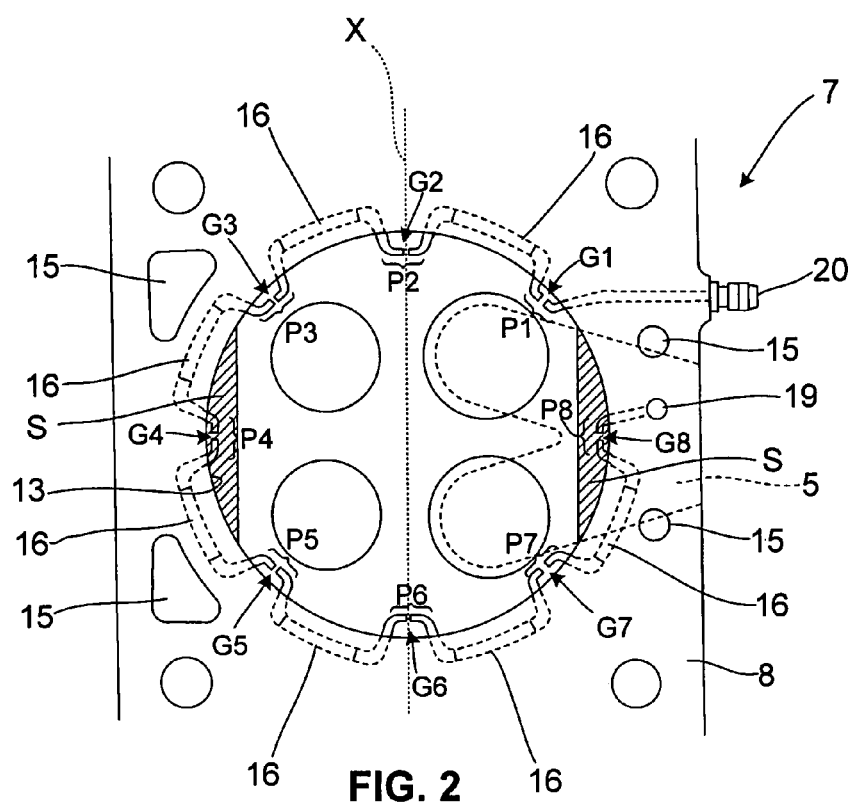
FIG. 2 is a schematic constitutional diagram of the multipoint ignition device.

As shown in FIG. 2, the multipoint ignition device 7 is formed integrally with a head gasket 8 of the engine 1. When the multipoint ignition device 7 is sandwiched between a cylinder head 9 and a cylinder block 10 of the engine 1, a plurality of electrode pairs P1 to P8 constituting ignition gaps G1 to G8 are disposed at substantially equal intervals around a cylinder opening portion 14 that opens onto an upper surface of the cylinder block 10. Each electrode pair P1 to P8 is constituted by a current-carrying electrode and an earth electrode that faces the current-carrying electrode via a minute gap. Similarly to a pre-existing electrode of a spark plug of the engine, each electrode pair P1 to P8 is formed from a metal exhibiting high heat resistance, such as nickel or platinum.

A plurality of openings are formed in the head gasket 8, and a central opening 13, which is the largest opening, has a substantially identical diameter to the cylinder opening portion 14 and is superposed on the cylinder opening portion 14. An inner peripheral surface of the opening 13 constitutes a side wall of the combustion chamber 2. A plurality of openings 15 disposed around the opening 13 serve as water holes connected to cooling water passages formed in the cylinder head 9 and cylinder block 10.

An intermediate member 16 formed from a conductive material is connected to each of the electrode pairs P1 to P8 such that adjacent electrode pairs are connected by the intermediate member 16. The intermediate members 16 are formed from the same material as the electrode pairs P1 to P8, for example nickel, but may be formed from a different material such as copper. The intermediate members 16 are buried in and held by the head gasket 8, and thus the electrode pairs P1 to P8 are held on the head gasket 8.

As well as functioning to hold the electrode pairs P1 to P8, the intermediate members 16 function to connect the electrode pairs P1 to P8 electrically in series. Hence, when a high secondary voltage is applied to a terminal 20, discharge occurs first in the ignition gap G1 of the electrode pair P1 connected to the terminal 20, after which discharge occurs in the ignition gap G2 of the electrode pair P2 adjacent thereto. Discharge then occurs in the manner of a chain reaction in sequence from the terminal 20 side until finally, discharge occurs in the ignition gap G8 of the electrode pair P8 connected to an earth terminal 19.

Figure 3:
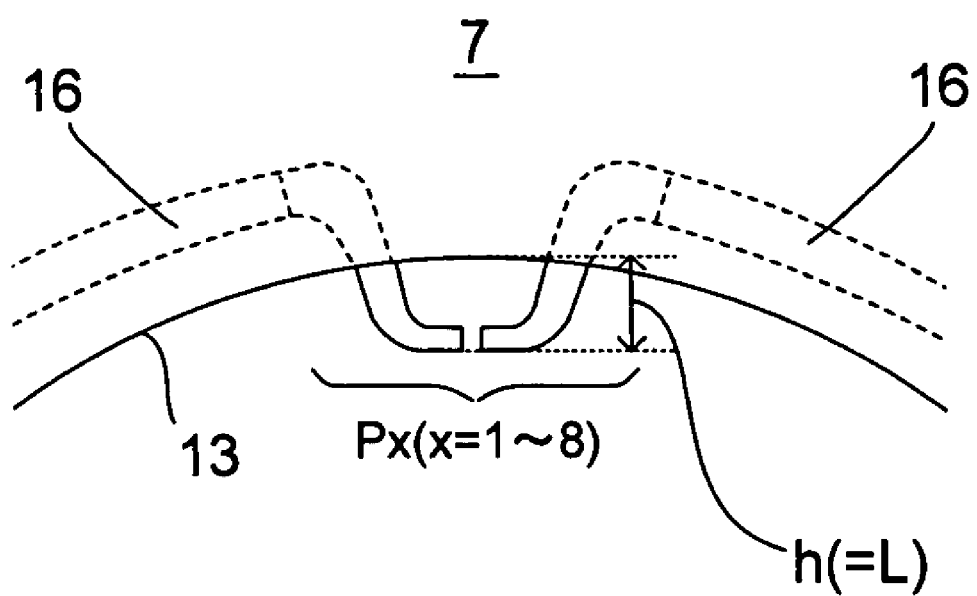
FIGS. 3 and 4 are enlarged views of an electrode pair.

Here, a distance L between the ignition gaps G1 to G8 of the electrode pairs P1 to P8 and the side wall of the combustion chamber 2, or in other words the inner peripheral surface of the opening 13 in the head gasket 8, differs according to the position of the electrode pair P1 to P8 such that the propagation speed of flames that grow from the respective ignition gaps G1 to G8 is uniform. More specifically, a projection amount h (see FIG. 3) of the electrode pairs P2, P6 disposed near a ridge line X of the pent roof onto the opening 13 is set to be larger than that of the electrode pairs P1, P3, P5, P7, and the projection amount of the electrode pairs P4, P8 disposed within the squish areas S onto the opening 13 is set to be smaller than that of the electrode pairs P1, P3, P5, P7.

The reason for this is that near the ridge line X of the pent roof, the height of the combustion chamber 2 is greater than the height of the other parts, and therefore the contact area between the flame and the wall surface of the combustion chamber 2 is large such that the extinguishing action produced by the wall surface of the combustion chamber 2 is greater than that of the other parts. Hence, by increasing the projection amount h of the electrode pairs P2, P6 to increase the distance L between the ignition gaps G2, G6 and the side wall of the combustion chamber 2, the extinguishing action produced by the wall surface of the combustion chamber 2 is less likely to be received, and the propagation speed of the flames that grow from the ignition gaps G2, G6 can be prevented from falling below the propagation speed of the flames that grow from the other ignition gaps due to the extinguishing action.

Conversely, the height of the combustion chamber 2 in the squish areas S is lower than the height of the other parts, and therefore the contact area between the flame and the wall surface of the combustion chamber 2 is small such that the extinguishing action produced by the wall surface of the combustion chamber 2 is smaller than that of the other parts. Hence, by decreasing the projection amount h of the electrode pairs P4, P8 to decrease the distance L between the ignition gaps G4, G8 and the side wall of the combustion chamber 2, the extinguishing action produced by the wall surface of the combustion chamber 2 is more likely to be received, and the propagation speed of the flames that grow from the ignition gaps G4, G8 can be prevented from becoming faster than the propagation speed of the flames that grow from the other ignition gaps.

From this state, the projection amount h of the electrode pairs P3 to P5 disposed on the exhaust side of the combustion chamber 2 may also be reduced. The reason for this is that on the exhaust side of the combustion chamber 2, the wall surface temperature is higher than on the intake side due to the high-temperature exhaust gas, the exhaust valves 4, and the heat received from the valve seats thereof, and therefore the extinguishing action produced by the wall surface of the combustion chamber 2 is correspondingly smaller. By reducing the projection amount h of the electrode pairs P3 to P5 disposed on the exhaust side of the combustion chamber 2, the extinguishing action produced by the wall surface of the combustion chamber 2 is more likely to be received, and therefore the propagation speed of the flames that grow from the ignition gaps G1 to G8 can be made even more uniform.

Thus, in the multipoint ignition device 7 according to this invention, the distance 1 between the ignition gaps G1 to G8 of the electrode pairs P1 to P8 and the side wall of the combustion chamber 2 is varied according to the position of the electrode pair P1 to P8 so that the propagation speed of the flames that grow from the ignition gaps G1 to G8 can be made uniform, and as a result, the flames can propagate through the entire combustion chamber 2 quickly, enabling a reduction in the amount of time required to burn the air-fuel mixture in the combustion chamber 2.

Figure 4:
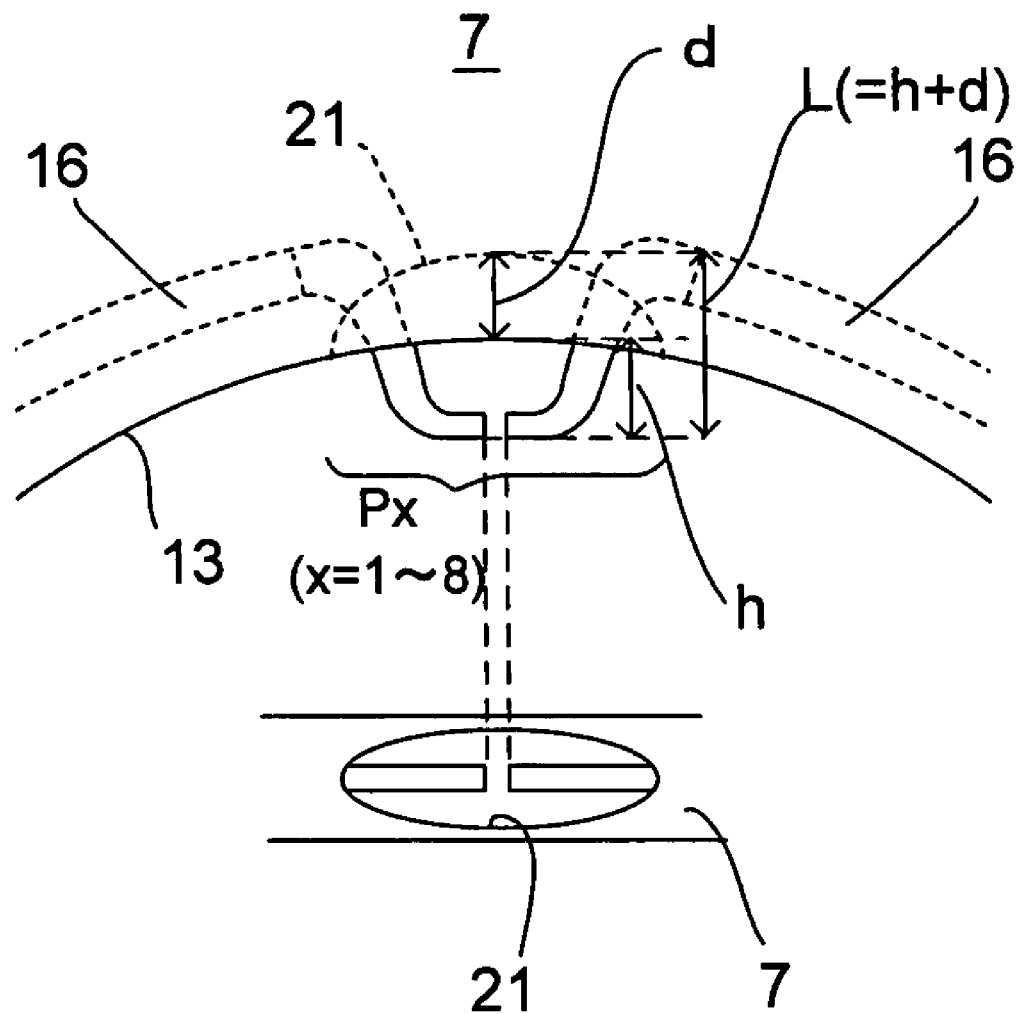

In this embodiment, the distance L between the ignition gaps G1 to G8 and the side wall of the combustion chamber 2 is varied according to the position of the electrode pair P1 to P8 by varying the projection amount h of the electrode pairs P1 to P8. However, instead of, or in addition to, varying the projection amount h, bowl-shaped indentations 21 may be formed in the side wall of the combustion chamber 2, or more specifically in positions facing the respective ignition gaps G1 to G8 on the inner peripheral surface of the opening 13 in the head gasket 8, as shown in FIG. 4, and the distance L between the ignition gaps G1 to G8 and the side wall of the combustion chamber 2 may be varied according to the position of the electrode pair P1 to P8 by varying a depth d of the indentations 21. In this case, the distance L between the ignition gaps G1 to G8 and the side wall of the combustion chamber 2 is the sum of the projection amount h of the electrode pairs P1 to P8 and the depth d of the indentation 21.

When the depth d of the indentation 21 is increased, the extinguishing action produced by the wall surface of the combustion chamber 2 becomes less likely to be received, and therefore the propagation speed of the flame can be increased. Conversely, when the depth d of the indentation 21 is reduced or the indentation 21 is not provided, the extinguishing action produced by the wall surface of the combustion chamber 2 is more likely to be received, and therefore the propagation speed of the flame can be reduced.

When the indentation 21 is formed, the distance L between the ignition gaps G1 to G8 and the side wall of the combustion chamber 2 can be increased further by forming the indentation 21 as well as increasing the projection amount h of the electrode pairs P1 to P8. However, when the projection amount h of electrode pairs such as the electrode pairs P1, P3, P5 and P7 is increased, these electrode pairs interfere with the intake valves 3 or exhaust valves 4, and therefore forming the indentation 21 is also effective when increases in the projection amount h are limited.

Figure 5:
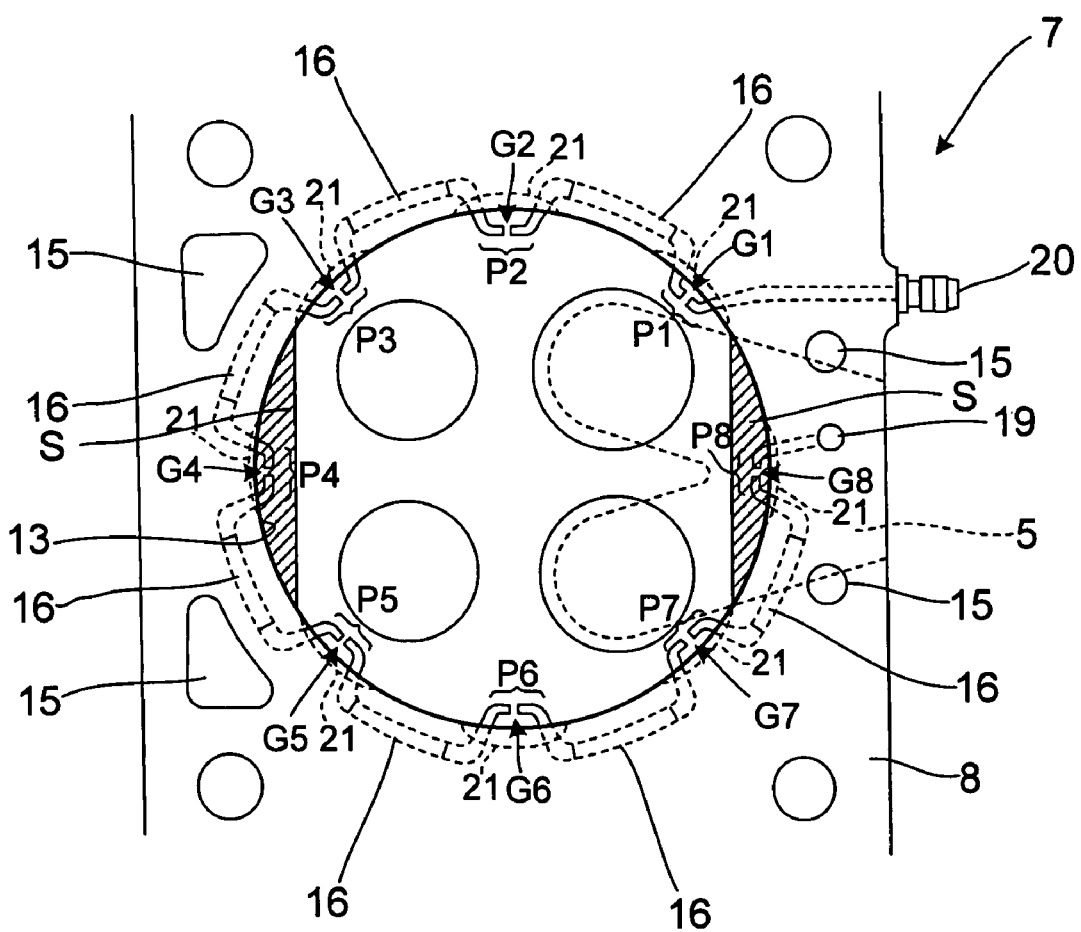
FIG. 5 is a schematic constitutional diagram of a multipoint ignition device having a different constitution.

FIG. 5 shows an example in which the propagation speed of the flames that grow from the ignition gaps G1 to G8 is made uniform by varying only the depth d of the indentation 21 according to the position of the electrode pair P1 to P8 instead of modifying the projection amount h of the electrode pairs P1 to P8.

In this example, the depth d of the indentations 21 facing the ignition gaps G2, G6 of the electrode pairs P2, P6 disposed near the ridge line X of the pent roof is made greater than the depth d of the indentations 21 facing the ignition gaps G1, G3, G5 and G7, while the depth d of the indentations 21 facing the ignition gaps G4, G8 of the electrode pairs P4, P8 disposed within the squish areas S is made smaller than the depth d of the indentations 21 facing the ignition gaps G1, G3, G5 and G7.

From this state, the depth d of the indentations 21 facing the ignition gaps G3 to G5 disposed on the exhaust side of the combustion chamber 2 may also be reduced. As described above, the extinguishing action produced by the wall surface of the combustion chamber 2 is smaller on the exhaust side than on the intake side due to differences in the wall surface temperature, and therefore, by reducing the depth d of the indentations 21 facing the ignition gaps G3 to G5, the propagation speed of the flames that grow from the ignition gaps G1 to G8 can be made even more uniform.

What is claimed is:

1. A multipoint ignition device having a plurality of electrode pairs constituting ignition gaps, the plurality of electrode pairs being disposed around a cylinder opening portion of an engine, wherein the plurality of electrode pairs project from a side wall of a combustion chamber of the engine, and a propagation speed of a flame that grows from each ignition gap is made uniform by varying a distance between the ignition gap and the side wall of the combustion chamber according to respective positions of the plurality of electrode pairs.

2. A multipoint ignition device, having a plurality of electrode pairs constituting ignition gaps, the plurality of electrode pairs being disposed around a cylinder opening portion of an engine,
- wherein the plurality of electrode pairs project from a side wall of a combustion chamber of the engine, and
- wherein a propagation speed of a flame that grows from each ignition gap is made uniform by varying a distance between the ignition gap and the side wall of the combustion chamber according to respective positions of the plurality of electrode pairs, and
- wherein the distance between the ignition gap and the side wall of the combustion chamber is varied according to the respective positions of the plurality of electrode pairs by varying a projection amount of the plurality of electrode pairs.

3. A multipoint ignition device, having a plurality of electrode pairs constituting ignition gaps, the plurality of electrode pairs being disposed around a cylinder opening portion of an engine,
- wherein the plurality of electrode pairs project from a side wall of a combustion chamber of the engine, and
- wherein a propagation speed of a flame that grows from each ignition gap is made uniform by varying a distance between the ignition gap and the side wall of the combustion chamber according to respective positions of the plurality of electrode pairs, and
- wherein an indentation is formed in the side wall of the combustion chamber in a position facing the ignition gap, and
- the distance between the ignition gap and the side wall of the combustion chamber is varied according to the respective positions of the plurality of electrode pairs by varying a depth of the indentation.

4. A multipoint ignition device, having a plurality of electrode pairs constituting ignition gap, the plurality of electrode pairs being disposed around a cylinder opening portion of an engine,
- wherein the plurality of electrode pairs project from a side wall of a combustion chamber of the engine, and
- wherein a propagation speed of a flame that grows from each ignition gap is made uniform by varying a distance between the ignition gap and the side wall of the combustion chamber according to respective positions of the plurality of electrode pairs, and
- wherein, in relation to an electrode pair disposed in a part in which an extinguishing action produced by a wall surface of the combustion chamber is greater than the extinguishing action in another part, the distance between an ignition gap thereof and the side wall of the combustion chamber is made larger than that of an electrode pair disposed in the other part.

5. The multipoint ignition device as defined in claim 4, wherein the engine has a pent roof type combustion chamber, and
- the electrode pair disposed in the part in which the extinguishing action produced by the wall surface of the combustion chamber is greater than the extinguishing action in the other part is disposed near a ridge line of the pent roof of the combustion chamber.

6. A multipoint ignition device, having a plurality of electrode pairs constituting ignition gaps, the plurality of electrode pairs being disposed around a cylinder opening portion of an engine,
- wherein the plurality of electrode pairs project from a side wall of a combustion chamber of the engine, and
- wherein a propagation speed of a flame that grows from each ignition gap is made uniform by varying a distance between the ignition gap and the side wall of the combustion chamber according to respective positions of the plurality of electrode pairs, and
- wherein, in relation to an electrode pair disposed in a part in which the extinguishing action produced by the wall surface of the combustion chamber is smaller than the extinguishing action in another part, the distance between an ignition gap thereof and the side wall of the combustion chamber is made smaller than that of an electrode pair disposed in the other part.

7. The multipoint ignition device as defined in claim 6, wherein the engine has a squish area in the combustion chamber, and
- the electrode pair disposed in the part in which the extinguishing action produced by the wall surface of the combustion chamber is smaller than the extinguishing action in the other part is the electrode pair disposed in the squish area.

8. The multipoint ignition device as defined in claim 6, wherein the electrode pair disposed in the part in which the extinguishing action produced by the wall surface of the combustion chamber is smaller than the extinguishing action in the other part is the electrode pair disposed on an exhaust side of the engine.

* * * * *